April 26, 1927.　　　G. R. KYLE ET AL　　　1,626,041
BELT CONVEYER
Filed April 21, 1925　　　3 Sheets-Sheet 1
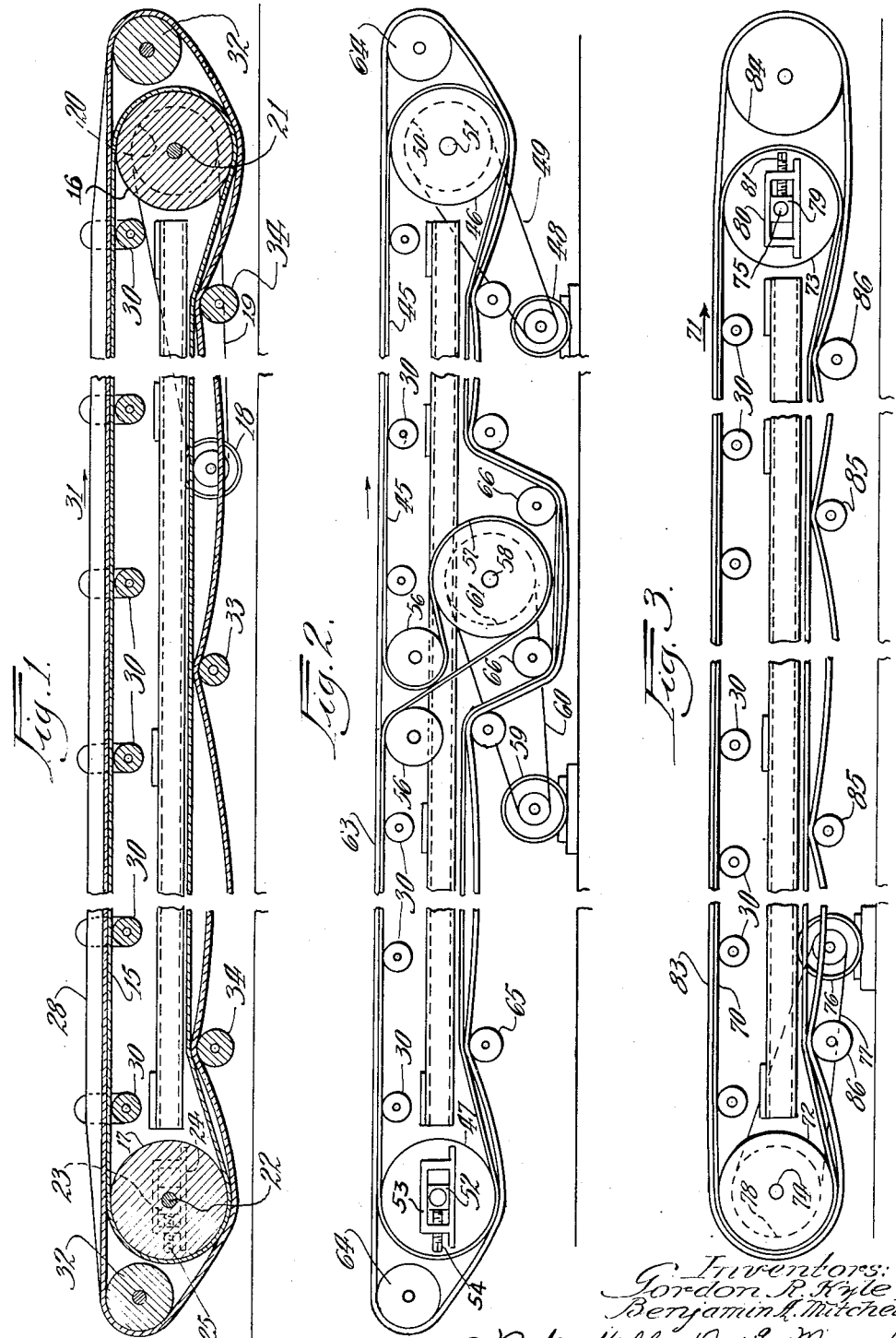

April 26, 1927.                G. R. KYLE ET AL                1,626,041
                                 BELT CONVEYER
                              Filed April 21, 1925          3 Sheets-Sheet 2
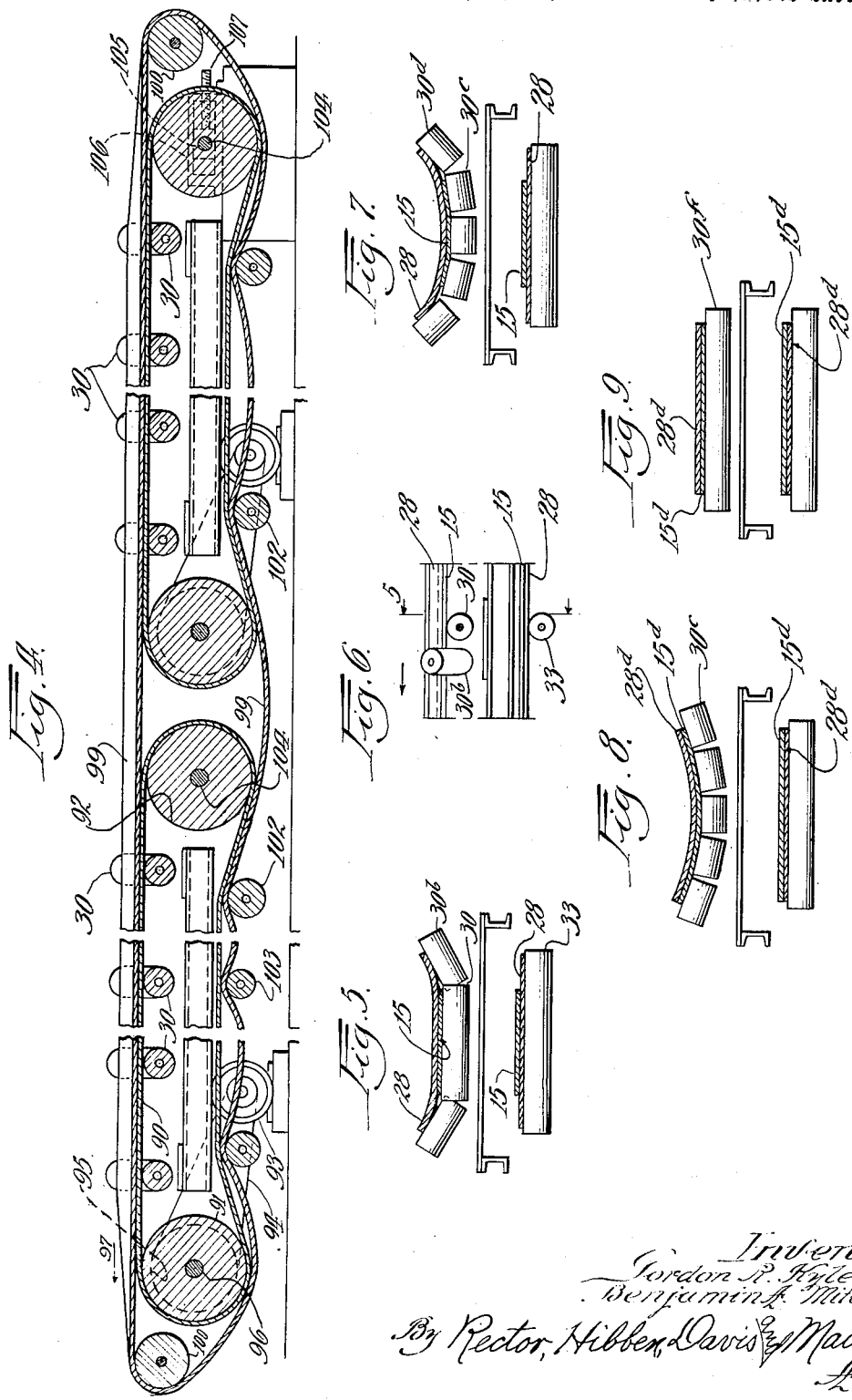

April 26, 1927.　　　G. R. KYLE ET AL　　　1,626,041
BELT CONVEYER
Filed April 21, 1925　　　3 Sheets-Sheet 3
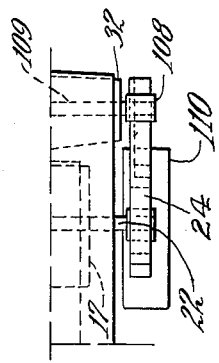
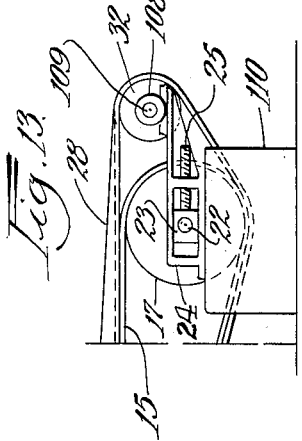
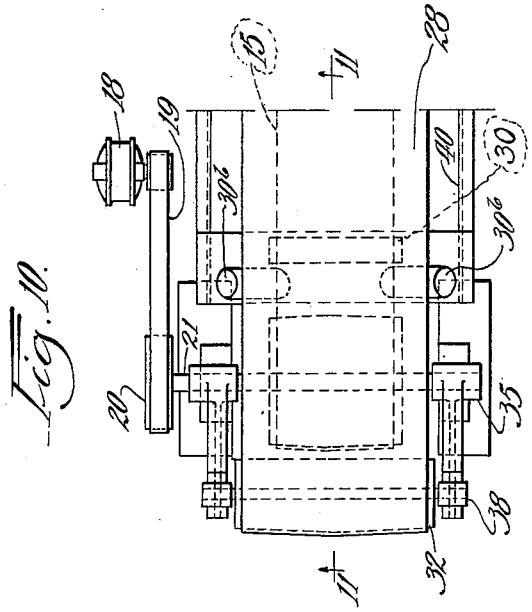

Patented Apr. 26, 1927.

1,626,041

UNITED STATES PATENT OFFICE.

GORDON R. KYLE, OF BELLEVILLE, NEW JERSEY, AND BENJAMIN A. MITCHELL, OF WEST NEW BRIGHTON, NEW YORK.

BELT CONVEYER.

Application filed April 21, 1925. Serial No. 24,751.

This application is a continuation in part of our prior copending application, Serial No. 608,157, filed December 21, 1922.

This invention relates to improvements in belt conveyers and its purpose is to provide improved means for conveying crushed ore, sand and other loose materials in either a hot or cold condition. Devices of this kind, as heretofore constructed, have been made in one piece and it has been found in practice that the outer layer of rubber compounds or other material forming the covering layer of the belt with which the material conveyed contacts often becomes partially detached from the fabric structure or underlying body portion of the belt, and that the wear is very unequal across the width of the belt, with the result that the entire conveying belt has to be discarded and replaced by a new one. The principal object of the present invention is to provide a belt conveyer comprising a separate wearing pad or member, having great flexibility and abrasion resisting qualities, as well as great heat resisting qualities for withstanding hot material such as cement clinkers and coke which has just been quenched. The improved belt conveyer comprises, also, separate power transmitting means, preferably in the form of a transmission belt having great tensile strength, which may be constructed at a cost of about seventy-five per cent of the total cost of the conveyer belts heretofore used. The separate wearing pad or sheet with which the conveyed materials directly contact may be renewed without replacing the transmission means so that after continued use of the belt conveyer of the present invention, the separate wearing pad or sheet may be replaced at a relatively small cost as compared with the cost of replacement of the entire conveyer belt of the type in use prior to the present invention. A further object of the present invention is to provide a belt conveyer comprising a separate wearing pad employed in combination with two or more power transmission means, whereby there is rendered possible a reduction in the size and cost of the power transmission means. A further important object of the invention is to provide a belt conveyer comprising a separate wearing pad which is driven by frictional contact only with the power driven power transmission means, so that tensile stresses in the wearing pad are substantially eliminated. The power transmission means may be entirely surrounded by the endless wearing pad which may be frictionally engaged with both the upper and lower runs of the power transmission means when this power transmission means is in the form of an endless belt. Still another feature of the invention is the provision of a wearing pad or sheet having equal or greater width than the underlying power transmission means or belt so that the loose materials being conveyed are prevented from lodging between the wearing sheet and the power transmission means. Where the wearing pad or sheet is of greater width than the conveying means or belt, the wearing pad or sheet alone can be troughed at a greater angle than the power transmission means, thus retaining the materials on the wearing pad without the necessity of imparting any transverse curvature to the underlying transmission means. Other objects and advantages of the invention relate to various features of construction and arrangement which will appear more fully hereinafter.

The nature of the invention will be understood from the following specification taken with the accompanying drawings in which certain embodiments are illustrated.

In the drawings Fig. 1 shows a longitudinal section through the center line of a belt conveyer embodying the features of the present invention; Fig. 2 shows a side elevation of a belt conveyer which is similar to that illustrated in Fig. 1 except that a plurality of means are provided for positively driving the endless power transmission means; Fig. 3 shows a side elevation of a modified form of the improved belt conveyer in which an idler pulley is employed at one end only of the endless wearing pad or sheet; Fig. 4 shows a longitudinal section through the center line of a further modified form of construction in which the endless wearing pad or sheet is driven by frictional contact with a plurality of endless power transmitting members; Fig. 5 shows a transverse section through a belt conveyer illustrating a method of troughing the wear sheet, which may be employed in connection with any one of the belt conveyers illustrated in Figs. 1, 2 and 3, the section being taken on the line 5—5 of Fig. 6; Fig. 6 shows a side elevation of a portion of a belt conveyer embodying the structure illustrated in Fig. 5; Fig. 7 shows a transverse section through a belt conveyer embodying the features of the present invention, illustrating a modified method of troughing in which the endless power transmission belt and also the endless wear pad or sheet are troughed by a series of idler pulleys; Fig. 8 shows a transverse section through a belt conveyer of the present invention illustrating a third method of troughing in which a series of idler pulleys of equal width are employed for imparting a uniform curvature to the upper runs of a wearing pad and a transmission belt of equal width; Fig. 9 shows a transverse section through a belt conveyer of the present invention illustrating an endless wearing pad and an endless transmission belt arranged to lie flat on the supporting idlers; Fig. 10 shows a top plan view of the end portion of one of the belt conveyers of the present invention, such as that illustrated in Fig. 1, illustrating the means for driving the endless transmission means and the arrangement of means for troughing the upper runs of the belts; Fig. 11 shows a longitudinal section taken on the line 11—11 of Fig. 10; Fig. 12 shows a top plan view of one side portion of one of the belt conveyers of the present invention at the take-up end thereof, such as that illustrated in Fig. 1, showing the means for supporting the endless transmission means and adjusting the tension therein together with the arrangement for supporting the wearing pad; and Fig. 13 shows a side elevation of the structure shown in Fig. 12. In some of the foregoing views of the drawings the supports for the pulleys and rolls have been omitted for the sake of clearness and a somewhat diagrammatic illustration made without illustrating all of those details which may be supplied by one skilled in the art.

Referring to the invention as illustrated in the drawings, and more particularly to the embodiment thereof illustrated in Fig. 1, the improved belt conveyer is shown as comprising an endless power transmission means 15 which may preferably be in the form of a belt comprising a number of layers of cord or fabric imbedded in rubber compound according to any of the usual methods employed in belt manufacture, or it may be any other suitable power transmission means having excessive width as compared with its thickness in order to give flexibility and great tensile strength. The endless transmission member 15 is supported by a pulley 16 and a pulley 17, both of which are slightly crowned, the pulley 16 being positively driven from a motor 18 by means of a belt 19 passing around another pulley 20 fixed on the shaft 21 of the pulley 16. The pulley 17 is mounted on a shaft 22 which is preferably mounted in bearing blocks 23 slidably mounted in guide members 24 and capable of adjustment by means of screws 25 for the purpose of regulating the tension in the power transmission means 15. The power transmission belt 15 is arranged to cooperate with an endless wearing belt or sheet 28 which extends completely around the belt 15 and which may be of the same width as the belt 15 but which preferably projects laterally beyond both edges of the belt 15. The endless wear sheet 28 may be formed of rubber compound or other suitable material or combination of materials, the rubber compound having greater cross sectional area than that of the cord or fabric or other material imbedded therein. The endless wearing pad or sheet 28 is driven entirely by friction contact with the endless transmission means 15 which contacts with the upper run of the endless wearing pad substantially throughout the length thereof so that substantially all portions of the load conveying portions of the endless wearing pad 28 are in frictional contact with the underlying supporting and power transmitting portion of the endless power transmitting belt 15. The upper runs of the endless transmission belt 15 and the endless wearing pad 28 are supported by idler pulleys 30 mounted in suitable bearings with their axes extending transversely to the direction of travel of the upper runs of the belts which is indicated by the arrows 31. The endless wearing pad 28, as illustrated in Fig. 1, is supported and guided at each end of the upper run by idler pulleys 32 which are located in close proximity to the pulleys 16 and 17. The lower runs of the power transmission belt 15 and the endless wearing pad 28 are supported by idler pulleys 33 and snubber pulleys 34, so that the wearing pad is driven at these points also by frictional contact with the belt 15. The endless wearing pad 28 is preferably of sufficient length to provide some slack therein between the pulleys 33 and 34 and between the pulleys 34 and the adjacent pulleys 16 and 17. The idler pulleys 32 which are engaged by the endless wearing pad 28 at the ends of its upper run are preferably heavily crowned, as shown in Figs. 10 and 12, so that they maintain a positive alignment of the wearing pad on the upper run of the power transmission belt 15 independently of the action of the belt 15.

The loose materials to be conveyed are carried on the wearing pad 28 between the pulleys 32. The means for introducing these materials onto the wearing pad or sheet and for receiving the materials therefrom at the discharge end of the belt conveyer may be designed according to any of the well-known methods heretofore employed and these devices are therefore not illustrated. To prevent the loose materials from passing over the lateral edges of the wearing pad 28 the troughing idler pulleys 30 are preferably arranged to give the upper run of the belt conveyer a concave lateral curvature. This may preferably be done by means of idler pulleys 30 arranged as shown in Figs. 5 and 6 or it may be done by employing either one of the arrangements shown in Figs. 7 and 8. As shown in Figs. 5 and 6, the transmission belt 15 rests on the horizontal idler pulley 30 having its axis horizontal and the lateral edges of the wearing pad 28 are inclined upwardly by means of the idler pulleys 30$^b$. The pulleys 33 and 34 which engage the lower runs of the belts 15 and 28 extend horizontally, as shown in Fig. 5. By causing the transmission means 15 to retain a substantially flat position, particularly in the upper run thereof, the life of the transmission belt is greatly increased and the efficiency of the conveying apparatus is thereby improved. The projection of the wearing pad 28 beyond the lateral edges of the power transmission member 15 not only permits a greater troughing by the inclination of the edges of the wearing pad alone but it prevents the entrance of loose materials between the wear sheet and the power transmission means. A further advantage of this arrangement is that the troughing is confined to the relatively flexible wearing pad or sheet 28 and no lateral flexing of the power transmission means 15 is effected, thus preventing possible breaking of the plies of the cord or fabric of the transmission belt.

A modified form of arrangement of the troughing rollers for imparting a transverse curvature to the belt conveyer in the upper run thereof is shown in Fig. 7. In this construction the upper run of the transmission belt 15 is engaged on its underside by three troughing rollers 30$^c$ which impart a curvature to the transmission belt as well as to the underlying wearing pad or sheet. The wearing pad or sheet is troughed by additional rollers 30$^d$ which have a greater inclination than the rollers 30$^c$ so that the edges of the wearing pad are inclined upwardly to a considerable degree. The lower runs of both the wearing pad and the transmission belt are mounted to travel on rollers arranged with their axes extending horizontally.

In Fig. 8 there is illustrated another method of troughing the upper runs of the belt and the wearing pad or sheet. In this construction the wearing pad 28$^d$ is of the same width as the underlying transmission belt 15$^d$ and they are troughed with uniform curvature by a series of rollers 30$^e$ of equal width. In this construction, also, the lower runs are mounted on rollers arranged on horizontal axes.

In Fig. 9 of the drawings, there is illustrated an arrangement in which a wearing pad 28$^d$ of the same width as the underlying transmission belt 15$^d$ is arranged for support on the upper run thereof by a plurality of rollers 30$^f$. In this construction, the upper runs of the wearing pad and the underlying transmission belt are flat, no troughing being effected.

An arrangement of driving mechanism which may be employed in connection with the conveyer illustrated in Fig. 1, as well as with the conveyers illustrated in other figures of the drawings, is shown in Figs. 10 and 11. The motor 18 is here shown connected by the belt 19 with a pulley 20 mounted on the shaft 21 of the pulley 16 which is engaged by the power transmission belt 15 at one end of the conveyer. The shaft 21 is journaled in bearings 35 secured on suitable foundation members 36 and the bearings 35 are provided with longitudinally extending brackets 37 which carry bearings 38 for the shaft 39 of the adjacent idler pulley 32 over which the wearing pad 28 travels. The pulleys 32 are preferably heavily crowned and are preferably of less diameter than the pulleys 16 and 17 over which the power transmission belt 15 travels. The troughing pulleys 30, which are illustrated in Fig. 10 as having the form shown more particularly in Figs. 5 and 6, may be suitably mounted with their bearings supported by a steel or wooden framework 40 adapted also to support the various other troughing and snubbing pulleys of the system. Although the wearing pad or sheet 28 is illustrated as having considerable slack in the lower run thereof, this slack may be regulated by changing the positions of the bearings 38 on the brackets 37. The arrangement of the tensioning mechanism which may be employed in connection with the conveyer illustrated in Fig. 1, as well as with the conveyers illustrated in other figures of the drawings, is shown in Figs. 12 and 13 where the pulley 17 mounted on the shaft 22, as shown in Fig. 1, has its ends slidably mounted in the previously described blocks 23 for the purpose of adjustment by means of the screws 25 in regulating the tension of the belt 15. The guide members 24 in which the blocks 23 are mounted are fixed on foundation members 110 and the bearings 108 for the shaft 109 of the idler pulley 32 are mounted on extensions of the guide members 24 so that the relatively small and heavily crowned idler pulley 32 is supported outwardly from the larger pulley 17.

A modified construction of the belt conveyer is illustrated in Fig. 2 where the endless power transmission means 45 is shown as being supported at opposite ends of its upper run by means of pulleys 46 and 47. The power transmission means 45 may be in the form of an endless belt constructed as described in connection with the power transmission belt of Fig. 1 and it is positively driven from a motor 48 by means of a belt 49 extending around a pulley 50 mounted on the shaft 51 of the pulley 46. The pulley 47 has its shaft journaled in bearing blocks 52 which are adjustable in guideways 53 by means of adjusting screws 54 so that tension in the belt 45 may be regulated as desired. The upper run of the power transmission belt 45 is supported between the pulleys 46 and 47 by a plurality of idler or troughing pulleys 30 which may be similar to any of the forms previously described and at a point, preferably substantially midway between the pulleys 46 and 47, the upper run of the belt 45 is extended downwardly around idler pulleys 56 and the loop in the transmission belt formed between the idler pulleys 56 is passed around a second driving pulley 57 mounted on a shaft 58 and driven from a motor 59 by means of a belt 60 extending around a pulley 61 fixed on the shaft 58. An endless wear pad or sheet 63, constructed preferably like the wearing pad 28 previously described, is mounted to extend completely around the upper and lower runs of the power transmission belt 45 with the ends of the upper run thereof supported by idler pulleys 64 arranged adjacent to the pulleys 46 and 47. The lower runs of the power transmission belt 45 and endless wearing pad or sheet 63 are supported by idler pulleys 65 and their direction of travel is controlled also by idler pulleys 66 arranged adjacent to the driving pulley 61. By means of this construction the power transmission belt 45 is positively driven at a plurality of points. The wearing pad or sheet 63 is preferably of equal or greater width than the power transmission belt and is driven entirely by frictional contact with the upper run of the belt 45. The idler pulleys 56 are arranged adjacent to each other and the idlers 64 are arranged adjacent to the pulleys 46 and 47 so that the upper run of the wearing pad 63 contacts substantially throughout its length with the upper run of the power transmission belt 45. The upper runs of either the wearing pad 63 or the transmission belt 45, or both, may be troughed by any one of the methods illustrated in Figs. 5, 7 and 8. The driving connections may be such as are illustrated in Figs. 10 and 11.

In Fig. 3 of the drawings, there is illustrated another modified form of construction in which the wearing pad is guided by an idler at one end only of its upper run. In this construction, an endless transmission belt 70 is mounted to travel in the direction indicated by the arrow 71, being supported at its ends by pulleys 72 and 73 mounted on shafts 74 and 75 respectively. The power transmission belt is actuated by a motor 76 connected by a belt 77 with a pulley 78 fixed on the shaft 74 and the shaft 75, on which the pulley 73 is mounted, is preferably journaled in blocks 79 which are capable of being adjusted in guideways 80 by means of screws 81 in order to vary the tension of transmission belt, which is preferably constructed as described in connection with the form of the invention illustrated in Fig. 1. An endless wearing pad or sheet 83 extends completely around the transmission belt 70 and is guided at one end of the conveyer by a crowned idler pulley 84. The upper runs of the wearing pad and the transmission belt are supported by idler pulleys 30 and the lower runs are supported by idler pulleys 85 and snubber pulleys 86. The driving means may be arranged as shown in Figs. 10 and 11 and, if desired, the troughing pulleys 30 may be arranged as shown in any one of Figs. 5, 7 and 8.

Still another modification of the invention is illustrated in Fig. 4 where the endless wearing pad or sheet is shown as being driven by frictional contact with a plurality of endless transmission means. In this construction there are two endless transmission belts 90, constructed preferably as described in connection with the embodiment illustrated in Fig. 1 and each belt 90 is supported by pulleys 91 and 92. Each of the pulleys 91 is driven by a motor 93 connected by a belt 94 with a pulley 95 fixed on the shaft 96 thereof, with the result that the upper runs of the belts 90 travel in the direction indicated by the arrow 97. The pulleys 92 are mounted on shafts 104 which are preferably journaled in bearing blocks 105 arranged for adjustment in guideways 106 by means of screws 107, so that the tension in the transmission belts 90 may be regulated. An endless wearing pad or sheet 99 extends completely around the two transmission belts 90 and is constructed preferably as is described in connection with the endless wearing pad or sheet illustrated in Fig. 1. The endless wearing pad or sheet 99 is supported and guided at the ends of the upper run thereof by means of idler pulleys 100 which are preferably heavily crowned in order to retain the wearing pad in proper alignment on the transmission means 90. The upper runs of the transmission belts 90 and of the wearing pad 99 are supported by idler pulleys 30 which may be troughed, as illustrated in Figs. 5, 6 or 7, in order to impart a transverse concavity to the upper runs of any one or all of the members 90 and 99. The lower runs of the members 90 and 99 are supported by idler pulleys 102 and 103. The driving pulley 91 of one power transmission system is preferably arranged in close proximity to the pulley 92 of the next adjacent power transmission system, and the idler pulleys 100 are arranged adjacent to the pulleys 91 and 92 of the endless belts 90 so that the upper run of the endless wearing pad or sheet 99 contacts substantially throughout the length of the load conveying portions thereof with the upper runs of the transmission belts 90. The arrangement illustrated in Fig. 4 permits the use of a wearing pad of unusually small tensile strength and great flexibility. The use of a plurality of power transmission systems contacting with and driving the wearing pad, preferably on both the upper and lower runs thereof, permits the use of power transmission belts 90 of less tensile strength and correspondingly reduced cost as compared with the transmission belts required where only one such belt is employed to drive the upper run of the endless wearing pad.

By means of this invention, the life of belt conveyers is greatly increased and their operation rendered more satisfactory and efficient. The endless wearing pad or sheet merely supports the load of loose materials conveyed on the upper run thereof and is driven by frictional contact only of this load conveying portion with the underlying power transmission belt or belts, supplemented preferably by frictional contact of the lower run of the wearing pad with the power transmission means, thus enabling the use of an endless wearing pad having great wear resisting qualities without necessarily having also the great tensile strength which is required for conveyer belts of the type heretofore used. The power transmission belts may be constructed at a cost which is greatly reduced as compared with the cost of the conveyer belts heretofore used and the endless wearing pad may be replaced when worn at a cost which is very slight as compared with the cost of renewal of previously known forms of conveyer belts.

Although several embodiments of the invention have been shown and described, it will be understood that it may be constructed in various other forms within the scope of the appended claims.

We claim:

1. A belt conveyer comprising an endless transmission belt, an endless wearing pad, and means including said transmission belt for preventing tensional stress in the load conveying upper stretch of said wearing pad and for supporting and driving said endless wearing pad by frictional contact of a run of said wearing pad with a run of said transmission belt, the upper stretch of said wearing pad being of sufficient width to contact with substantially the entire width of the upper stretch of said transmission belt.

2. A belt conveyer comprising an endless transmission belt means for driving said transmission belt, and an endless wearing pad resting on and conveyed entirely by frictional contact with said transmission belt independently of the action of said transmission belt driving means, the load-conveying portion of said wearing pad contacting uninterruptedly with the entire width of said transmission belt substantially throughout the length of said load-conveying portion.

3. A belt conveyer comprising an endless wearing pad, an endless transmission belt supporting and driving said wearing pad, and means for troughing said wearing pad only.

4. A belt conveyer comprising endless transmission means, an endless wearing pad resting on and conveyed entirely by frictional contact with said transmission means and forming a protective covering for the upper load supporting stretch of said transmission means, and idler pulleys contacting with said wearing pad to support the lower runs of both said wearing pad and said transmission means and thereby driving the lower run of said wearing pad, said wearing pad having slack in the lower run thereof adjacent said idler pulleys.

5. A transmission belt conveyer comprising an endless belt, means for supporting and driving said transmission belt, an endless wearing pad extending around said belt and having substantially its entire upper run contacting with the upper run of said transmission belt, and idler pulleys engaging said wearing pad only beyond the ends of the upper run of said transmission belt.

6. A belt conveyer comprising an endless wearing pad, means for supporting and driving said wearing pad free of tensional stress in the upper load-conveying stretch thereof, said means including an endless transmission means contacting throughout its width with and extending substantially throughout the length of the said load conveying portion of said wearing pad, and an idler pulley engaging said wearing pad at the discharge end of the load conveying portion thereof for maintaining it in proper alignment on said transmission means.

7. A conveyer system comprising an endless wearing pad, power transmission means comprising supporting and driving means enclosed within and supporting and driving said wearing pad by contact therewith throughout substantially the entire length of the load-conveying portion of said wearing pad, said wearing pad being of greater width than said supporting and driving means, and means for troughing the projecting edges only of said wearing pad.

8. In combination, an endless transmission belt, means for supporting and driving said transmission belt, an endless wear sheet adapted to travel on the upper portion of said transmission belt, said wear sheet projecting beyond the lateral edges of said transmission belt, and means for troughing said wear sheet by inclining the projecting portions thereof.

9. The combination in a belt conveyer of endless transmission means, an endless wearing pad, and means including said transmission means for supporting and driving said endless wearing pad and preventing tensional stress in the upper load conveying stretch thereof which rests on and is in driving contact with the upper run of said endless transmission means.

10. A belt conveyer comprising an endless transmission belt, an endless wearing pad having the upper run thereof contacting with the upper run of said belt, and means including said transmission belt for supporting said wearing pad and for driving said wearing pad by frictional contact thereof with said transmission belt and preventing tensional stress in the wearing pad due to the load being conveyed, said wearing pad having the conveyed load supported entirely thereon.

11. A conveyer system comprising an endless wearing pad, power transmission means enclosed by and supporting and driving said wearing pad, said wearing pad being of greater width than said power transmission means, and means for troughing the projecting edges of said wearing pad.

12. A conveyer system comprising an endless wearing pad, power transmission means comprising a plurality of driving members enclosed within and supporting and driving said wearing pad, said wearing pad being of greater width than said driving members, and means for troughing the projecting edges of said wearing pad.

13. A conveyer system comprising endless power transmission means, means including pulleys for supporting and driving said endless power transmission means, an endless wearing pad extending around said power transmission means and contacting throughout the upper run thereof with said power transmission means throughout its width, said wearing pad being driven solely by frictional contact with said power transmission means, idler pulleys engaging and supporting said wearing pad at the ends of the upper run thereof, and means for driving said power transmission means.

14. A belt conveyer comprising an endless transmission belt having great tensile strength, means for supporting and driving said transmission belt, and an endless, highly flexible wearing pad having great abrasion resisting qualities and extending around said transmission belt and providing an endless protective covering for the entire upper load supporting stretch of said transmission belt.

15. The combination in a belt conveyer, of endless transmission means, means for supporting and driving said transmission means, an endless wearing pad mounted with its upper load conveying stretch traveling free of tensional stress therein on the upper run of said transmission means, said wearing pad being of sufficient width to protect said endless transmission means from contact with the material being conveyed on said wearing pad, and idler pulleys engaging said wearing pad only at the ends of the upper load conveying stretch thereof.

GORDON R. KYLE.
BENJAMIN A. MITCHELL.